US009367926B2

(12) United States Patent
Vilsmeier et al.

(10) Patent No.: US 9,367,926 B2
(45) Date of Patent: Jun. 14, 2016

(54) DETERMINING A FOUR-DIMENSIONAL CT IMAGE BASED ON THREE-DIMENSIONAL CT DATA AND FOUR-DIMENSIONAL MODEL DATA

(71) Applicant: Brainlab AG, Feldkirchen (DE)

(72) Inventors: Stefan Vilsmeier, München (DE); Andreas Blumhofer, Neubiberg (DE); Stefan Seifert, Kirchseeon (DE)

(73) Assignee: Brainlab AG, Feldkirchen (DE)

( * ) Notice: Subject to any disclaimer, the term of this patent is extended or adjusted under 35 U.S.C. 154(b) by 0 days.

(21) Appl. No.: 14/437,789

(22) PCT Filed: Oct. 26, 2012

(86) PCT No.: PCT/EP2012/071248
§ 371 (c)(1),
(2) Date: Apr. 22, 2015

(87) PCT Pub. No.: WO2014/063750
PCT Pub. Date: May 1, 2014

(65) Prior Publication Data
US 2015/0302608 A1    Oct. 22, 2015

(51) Int. Cl.
G06K 9/00      (2006.01)
G06T 7/20      (2006.01)
G06T 13/20     (2011.01)

(52) U.S. Cl.
CPC .............. *G06T 7/2046* (2013.01); *G06T 13/20* (2013.01); *G06T 2207/10076* (2013.01); *G06T 2207/30048* (2013.01); *G06T 2207/30061* (2013.01)

(58) Field of Classification Search
None
See application file for complete search history.

(56) References Cited

U.S. PATENT DOCUMENTS

| 2010/0232572 | A1  | 9/2010 | Nord et al. |
| 2014/0072194 | A1* | 3/2014 | Hansis ................... A61B 6/032 382/128 |
| 2015/0139503 | A1* | 5/2015 | Kabus ................... G06T 7/0016 382/107 |

OTHER PUBLICATIONS

Jan Ehrhardt et al., Statistical Modeling of 4D Respiratory Lung Motion Using Diffeomorphic Image Registration, IEEE Transactions on Medical Imaging, vol. 30, No. 2, Feb. 1, 2011, pp. 251-265, IEEE Service Center, Piscataway, NJ, US.

(Continued)

*Primary Examiner* — Stephen R Koziol
*Assistant Examiner* — Sean Conner
(74) *Attorney, Agent, or Firm* — Middleton Reutlinger

(57) ABSTRACT

The invention relates to a data processing method of determining a change of an image of an anatomical body part of a patient's body, the method being executed by a computer and comprising the following steps: a) acquiring static medical image data comprising static medical image information describing anatomical body part in a first anatomical spatial state of an anatomical vital spatial change of the anatomical body part; b) acquiring patient model data comprising patient model information describing a model body part corresponding to the anatomical body part, wherein the patient model information describes the model body part in a plurality of model spatial states of a model vital spatial change corresponding to the anatomical vital spatial change; c) determining spatial state mapping data comprising spatial state mapping information describing at least one of a first mapping from the model body part in a first one of the plurality of model spatial states to the model body part in a second, different one of the plurality of model spatial states, the first model spatial state corresponding to the first anatomical spatial state, and a second mapping from the model body part in the first model spatial state to the anatomical body part in the first anatomical spatial state; d) determining, based on the static medical image data and the spatial state mapping data, transformed medical image data comprising transformed medical image information describing the anatomical body part in a second anatomical spatial state of the anatomical vital spatial change, the second anatomical spatial state corresponding to the second model spatial state.

13 Claims, 5 Drawing Sheets

(56) References Cited

OTHER PUBLICATIONS

Aljabar P et al., Spatial Transformation of Motion and Deformation Fields Using Nonrigid Registration, IEEE Transactions on Medical Imaging, vol. 23, No. 9, Sep. 1, 2004, pp. 1065-1076, IEEE Service Center, Piscataway, NJ, US.

Sundaram T A et al., A dynamic model of average lung deformation using capacity-based reparameterization and shape averaging of lung MR images, Medical Image Computing and Computer-Assisted Intervention—MICCAI 2004. 7th International Conference. Proceedings. (Lecture notes in Comput. Sci. vol. 3217). vol. 2, 2004, p. 1000, Springer-Verlag Berlin, Germany.

European Patent Office, International Search Report of PCT/EP2012/071248, Jul. 2, 2013, pp. 1-4, European Patent Office, Rijswijk, The Netherlands.

* cited by examiner

DETERMINING A FOUR-DIMENSIONAL CT IMAGE BASED ON THREE-DIMENSIONAL CT DATA AND FOUR-DIMENSIONAL MODEL DATA

The present invention is directed to a method, in particular data processing method, of determining a change of an image of an anatomical body part. Furthermore, the invention is directed to a method, in particular data processing method, of determining a radiotherapy treatment plan which uses the method of determining a change of an image. The invention is also directed to a computer program corresponding to each of the methods and a computer running that computer program as well as a radiotherapy system including that computer.

A four-dimensional computed tomography (CT) is of interest to a multitude of medical procedures, in particular to radiotherapy treatment which needs to take into account movement of body parts during the treatment. An example of such a case is a radiotherapy treatment of body parts lying in the thorax of a patient which move due to breathing movement while the radiation therapy takes place. A tumour may for example be located in soft tissue inside the thorax and the soft tissue will move due to the breathing movement of the thorax. It is therefore desired to have information about the location of the thorax (in particular soft tissue inside the thorax) relative to a radiation source used for emitting the therapeutic radiation in order to ensure that the tumour is irradiated despite being moved due to the breathing movement.

Known approaches include generating a model of internal soft tissue movement which is due to breathing by time-correlating a position curve for the thorax which is recorded by tracking markers fastened to the thorax or breath flow information based on breath flow data recorded by a spirometer with CT image slices which were recorded while tracking the markers.

However, such an approach requires additional hardware for tracking the markers or taking the breath flow data, inflicts a comparably high radiation dose to the patient and in general involves a time-consuming preparation for recording the time-correlated information about soft tissue movement. The high radiation dose is in particular due to the fact that a slow CT scan would be needed which acquires medical image data over multiple breathing cycles to generate a sufficient data basis for correlation with the position curve or breath flow data, Besides that, these known approaches involve binning of the CT slices to a normally relatively low number of discrete phases of thoracic breathing movement so that assigning soft tissue positions to a specific phase of the breathing cycle may lead to some blurring of the time-correlated position determination for the soft tissue.

A problem to be solved by the invention therefore is to provide an efficient method for determining information about the position of soft tissue in a patient's body despite vital movements of the patient, which method is in particular associated with a low dose of imaging radiation and reduced requirements for equipment.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention as long as technically sensible and feasible. In particular, a feature of one embodiment which has the same or similar function of another feature of another embodiment can be exchanged. In particular, a feature of one embodiment which supplements a further function to another embodiment can be added to the other embodiment.

The method in accordance with the invention is in particular a data processing method. The data processing method is preferably performed using technical means, in particular a computer. The data processing method is in particular executed by or on the computer. Preferably, the inventive method is at least partly executed by a computer. That is, all steps or just some of the steps (i.e. less than a total number of steps) of the inventive method may be executed by a computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing" which describes computation, software, data access and storage services which do not require the end user to know the physical location and/or configuration of the computer delivering a specific service. In particular, the term "cloud" is used as a metaphor for the internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements and optionally a volatile memory (in particular, a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

The expression "acquiring data" encompasses in particular (within the framework of a data processing method) the scenario in which the data are determined by the data processing method or program. Determining data in particular encompasses measuring physical quantities and transforming the measured values into in particular digital data and/or computing the data by means of a computer, in particular computing the data within the method of the invention. The meaning of "acquiring data" in particular also encompasses the scenario in which the data are received or retrieved by the data processing method or program, for example from another program, a previous method step or a data storage medium, in particular for further processing by the data processing method or program. Thus, "acquiring data" can also for example mean waiting to receive data and/or receiving the data. The received data can for example be inputted via an interface. "Acquiring data" can also mean that the data processing method or program performs steps in order to (actively) receive or retrieve the data from a data source, for instance a data storage medium (such as for example a ROM, RAM, database, hard disc, etc.) or via the interface (for instance, from another computer or a network). The data can achieve the state of being "ready for use" by performing an additional step before the acquiring step. In accordance with this additional step, the data are generated in order to be acquired. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. Thus, "acquiring data" can also involve commanding a device to obtain and/or provide the data to be acquired. The acquiring step in particular does not involve an invasive step which would represent a substantial physical interference with the body requiring professional medical expertise to be carried out and entailing a substantial health risk even when carried out with the required professional care and expertise. Acquiring, in particular determining, data in particular does not involve a surgical step and in particular does not involve a step of treating a human or animal body using surgery or therapy. This also applies in particular to any steps directed to determining data. In order to distinguish the different data used by the present method, the data are denoted (i.e. referred to) as "XY data" and the like and are defined by the information which they describe which is preferably called "XY information".

In accordance with the invention, preferably a data processing method of determining a change of an image of an anatomical body part of a patient's body is provided. The image is in particular an image comprising medical image information and is preferably acquired by applying a medical imaging method to the anatomical body part. In the framework of this disclosure, the adjective "anatomical" refers to a feature, in particular a physical structure (such as a body part) or an abstract entity (such as a state or a change, in particular a movement) which is defined (in particular, is present) in the real world and in particular refers to features which are associated with the specific patient's body. The change of the image is in particular a change of image information in particular as a result of data processing carried out on image information which is input to the inventive method. In order to determine the change, preferably the following steps are executed.

Preferably, static medical image data is acquired which comprises static medical image information. The static medical image data is preferably acquired by a computed tomography (CT) scanner (in particular based on a helical computed tomography), in particular a CT scanner configured to acquire a cone beam computed tomography (CBCT)—a CBCT scanner. The static medical image information describes in particular a first anatomical spatial state of an anatomical vital spatial change of the anatomical body part. This means in particular that the first anatomical spatial state is a spatial state which the anatomical body part attains while the anatomical body part undergoes the anatomical vital spatial change. The spatial state of the anatomical body part is defined in particular by the spatial properties of the anatomical body part (in particular at a certain point in time). The spatial properties (also termed anatomical spatial properties) include at least one of the geometry of the anatomical body part, i.e. its size and/or shape, and the position of the anatomical body part in particular relative to other anatomical body parts of the patient's body. More particularly, the spatial properties of the anatomical body part are defined by medical image information (in particular, the static medical image information) representing an image of the anatomical body part. The anatomical vital spatial change is defined in particular as a change of the spatial properties of the anatomical body part, in particular as a deformation and/or movement of the anatomical body part. The deformation and/or movement is in particular cyclic, i.e. follows a periodic pattern in at least one of time and space. In the context of this disclosure, the term of vital spatial change describes in particular such a spatial change of spatial properties which are due to vital movements of at least part of the patient's body, in particular of the anatomical body part. Vital movements are understood to be movements which are not wilfully controlled by the patient, i.e. are controlled in particular by the somatic nervous system or another aero conduction system such as the cardiac conduction system. Reference is also made in this respect to patent applications EP 08 169 422.6 and EP 09 160 153.4, which discuss these vital movements in detail, the disclosure of these applications is herewith included in the present application by reference. Examples of vital movements are the beating of the heart in time and space, a bowel movement and the breathing movement of the thorax which occurs during inspiration and expiration. The anatomical body part may be any body part of the patient's body and in particular is a body part which undergoes a vital spatial change at some time. The anatomical body part comprises at least one of bony structures and soft tissue. The anatomical body part therefore represents preferably at least one of the thorax (the thorax being defined in particular as comprising at least one of bony structures such as ribs and soft tissue such as lung tissue and/or the diaphragm), the abdomen and the heart. The static medical image data is preferably acquired at a point in time in which the spatial properties of the anatomical body part remain static, in particular stationary, i.e. are not changing. The first anatomical spatial state may therefore be said to be a static anatomical spatial state. For example, the static medical image data is acquired at the maximum or minimum amplitude of the vital spatial change, for example at the point in time when the thorax is at a maximum of inspiration or a maximum of expiration, in particular the static medical image data is acquired while the patient holds his breath.

Preferably, patient model data is acquired which comprises patient model information. The patient model information describes in particular a model body part corresponding to the anatomical body part. The patient model information preferably describes the model body part in a plurality of model spatial states which are in particular part of a model vital spatial change which corresponds to the anatomical vital spatial change. The patient model data has preferably been generated outside of the inventive method.

The patient model data (in particular the patient model information) is in particular acquired based on a statistical analysis of the anatomy of the bodies of a plurality of human bodies, in particular on statistical analysis of the anatomy of the anatomical body part corresponding to the anatomical parts of a plurality of human bodies which correspond to the anatomical body part of the patient's body. More particularly, the patient model data is acquired from an anatomical atlas. An atlas typically consists of a plurality of generic models of objects, wherein the generic models of the objects together form a complex structure. In this case, the patient model data may also be called generic patient model data, the patient model information may also be called generic patient model information. The atlas of a femur, for example, can comprise the head, the neck, the body, the greater trochanter, the lesser trochanter and the lower extremity as objects which make up the complete structure. The atlas of a brain, for example, can comprise the telencephalon, the cerebellum, the diencephalon, the pons, the mesencephalon and the medulla as the objects which make up the complex structure. One application of such an atlas is in the segmentation of medical images, wherein the atlas is matched to medical image data, and the image data are compared with the matched atlas in order to assign a point (a pixel or voxel) of the image data to an object of the matched atlas, thereby segmenting the image data into objects.

Alternatively, the patient model data (in particular the patient model information) is acquired in particular based on medical image data which has been generated by e.g. a computed tomography (CT) of at least the anatomical body part of the specific patient. In this case, the patient model data may also be called anatomical patient model data, the patient model information may also be called anatomical patient model information. For example, the patient model data may have been acquired based on a CT generated from the anatomical body part of the specific patient for a plurality of phases of the anatomical vital spatial change. For example, anatomical patient model data is acquired only once for a specific patient and be re-used in different sessions of the envisaged medical procedure, whereby a radiation dose inflicted in the patient's body is reduced compared to known techniques.

The patient model information therefore describes a model body part which represents an anatomic structure (in particular, a model anatomic structure) of a human body, wherein the anatomic structure can be the anatomical structure of a full body or the anatomical structure of only part of a body. The term "part" means herein "full" or "all or less than full" or "all", i.e. only part (in the common sense).

The patient model information preferably describes the model body part in a plurality of model spatial states which are in particular part of a model vital spatial change which corresponds to the anatomical vital spatial change. Model spatial states in which the model body part is in between the phases described by the anatomical model information may be generated e.g. by interpolating the model spatial states described by the anatomical model patient information, for example in a linear fashion or by higher-order polynomial interpolation. Each of the plurality of model spatial states is defined in particular by the spatial properties of the model body part (in particular at a certain point in time). The patient model information can therefore be called four-dimensional (4D patient model data) as it describes spatial properties in preferably three dimensions which develop (change) with time as a fourth dimension. The spatial properties (also termed model spatial properties) include at least one of the geometry of the model body part, i.e. its size and/or shape, and the position of the model body part in particular relative to other model body parts comprised in the anatomic structure. In order to determine in the patient model information about a model body part which corresponds to the anatomical body part, preferably correspondence data is acquired comprising correspondence information which describes in particular which part of the anatomic structure corresponds to the (real) anatomical structure, i.e. the anatomical body part, represented by the static medical image information. According to a specific embodiment, the patient model information comprises, in particular consists of, generic patient image information representing an image of the model body part in preferably each one of the plurality of model spatial states. The model vital spatial change is defined in particular as a change of the spatial properties of the model body part, in particular as a deformation and/or movement of the body part. The deformation and/or movement is in particular cyclic, i.e. follows a periodic pattern in at least one of time and space. The correspondence information can be determined for example based on correlating grey value and/or positional information of the real anatomical structure contained in the static medical image information with corresponding information contained in the patient model information, in particular in the generic patient image information. Alternatively or additionally, the static medical image information may be fused to the patient model information by an image fusion algorithm with the subsequent valuation of the fusion result as to whether there is a difference in the respective information. For example, the patient model information may take the form of image information in order to simplify such a fusion.

In this application, the term "image morphing" is also used as an alternative to the term "image fusion", but with the same meaning. Elastic fusion transformations (e.g. image fusion transformation) are in particular designed to enable a seamless transition from one data set (e.g. first data set, e.g. first image) to another data set (e.g. second data set, e.g. second image). The transformation is in particular designed such that one of the first and second data sets (images) is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are in particular vectors of a deformation field F. These vectors are determined by the optimisation algorithm which results in an optimum degree of similarity. Thus, the optimum degree of similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), in particular in order to avoid pathological deformations (for instance, all the voxels being shifted to the same position by the transformation). The constraints include in particular the constraint that the transformation is regular, which in particular means that a Jacobian determinant calculated from a matrix of the deformation field (in particular, the vector field) is larger than zero. The constraints include in particular the constraint that the transformed (deformed) image is not self-intersecting and in particular that the transformed (deformed) image does not comprise faults and/or ruptures. The constraints include in particular the constraint that if a regular grid is transformed simultaneously with the image and in a corresponding manner, the grid is not allowed to interfold at any of its locations. The optimising problem is in particular solved iteratively, in particular by means of an optimisation algorithm which is in particular a first-order optimisation algorithm, in particular a gradient descent algorithm. Other examples of optimisation algorithms include optimisation algorithms which do not use derivations such as the downhill simplex algorithm or algorithms which use higher-order derivatives such as Newton-like algorithms. The optimisation algorithm preferably performs a local optimisation. If there are a plurality of local optima, global algorithms such as simulated annealing or genetic algorithms can be used. In the case of linear optimisation problems, the simplex method can for instance be used.

In the steps of the optimisation algorithms, the voxels are in particular shifted by a magnitude in a direction such that the degree of similarity is increased. This magnitude is preferably less than a predefined limit, for instance less than $\frac{1}{10}$ or $\frac{1}{100}$ or $\frac{1}{1000}$ of the diameter of the image, and in particular about equal to or less than the distance between neighbouring voxels. Due in particular to a high number of (iteration) steps, large deformations can be implemented.

The determined elastic fusion transformation can be in particular used to determine a degree of similarity (similarity measure also referred to as "measure of similarity") between the first and second data set (first and second image), To this end, the deviation of the elastic fusion transformation and an identity transformation is determined. The degree of deviations can be for instance calculated by determining the difference between the determinant of the elastic fusion transformation and the identity transformation. The higher the deviation is the less is the similarity. Thus, the degree of deviation can be used to determine a measure of similarity. A measure of similarity can in particular be determined on the basis of a determined correlation between the first and second data set.

The aforementioned fusion algorithm in particular determines an elastic fusion transformation which is preferably used to determine a degree of similarity (more particularly, a "measure of similarity") between the static medical image information and the patient model information. To this end, the deviation of the elastic fusion transformation and an identity transformation is determined. The degree of deviations can for instance be calculated by determining the difference between the determinant of the elastic fusion transformation and the identity transformation. The higher the deviation is, the less the similarity. Thus, a measure of similarity can in particular be determined on the basis of a determined correlation between the static medical image information and the patient model information.

The verb "to correspond" and the adjective "corresponding" in the framework of this disclosure in particular means that the "corresponding" features are anatomically the same, in particular that they represent the same body part which is present in the plurality of different human bodies and/or which consists of the same material and/or which is located at least approximately at the same location relative to other anatomical structures and/or which have a similar geometry (i.e. size and/or shape) in a plurality of (real) different human bodies.

Preferably, spatial state mapping data is acquired which comprises spatial state mapping information. The spatial state mapping information describes in particular at least one of a first mapping from the model body part in the first one of the plurality of model spatial states to the model body part in a second one of the plurality of model spatial states. The first and the second model spatial states differ from each other. In the context of this disclosure, the term of mapping is understood to denote a function which is in particular linear and which serves for mapping in particular three-dimensional coordinates onto the three-dimensional coordinates in a three-dimensional vector space. The mapping therefore takes the general form of a matrix, for example a multi-column matrix or a single-column matrix (i.e. a vector) depending on the number of degrees of freedom which are to be considered (mapped). The first model spatial state corresponds to the first anatomical spatial state. Alternatively or additionally, the spatial state mapping information describes a second mapping from the model body part in the first model spatial state to the anatomical body part in the first anatomical spatial state, i.e. a mapping from the reference system, in particular coordinate space, of the patient model information to the reference system, in particular coordinate space, of the static medical image information. The second mapping therefore advantageously also comprises a coordinate transformation which takes in particular the form of a linear transformation represented by a multi-column matrix, in particular a 4×4 matrix.

For example, if the model vital spatial change represents the thoracic movement during a breathing cycle, the individual model spatial states represent in particular individual phases of the thoracic movement. The spatial state mapping information therefore describes at least one of the first mapping and the second mapping.

Preferably, transformed medical image data is determined based on the static medical image data and the spatial state mapping data (in particular, based on the static medical image information and the spatial state mapping information). The transformed medical image data comprises transformed medical image information which describes in particular the anatomical body part in a second anatomical spatial state of the anatomical vital spatial change. The second anatomical spatial state corresponds to the second model spatial state. The transformed medical image information is determined in particular by applying the first mapping or the second mapping to the static medical image information (in particular to the anatomical body part in the first anatomical spatial state, more particularly to the spatial properties of the anatomical body part in the first anatomical spatial state). The second anatomical spatial state differs from the first anatomical spatial state since the first and second anatomical spatial states each represent individual, different phases of the anatomical vital spatial change such as for example different thoracic movement phases due to a breathing movement or different spatial properties of the heart due to different phases of the heart beat.

Preferably, the second anatomical spatial state comprises a plurality of second anatomical spatial states (in particular excluding the first anatomical spatial state, i.e. a plurality of second anatomical spatial states which are each different from the first anatomical spatial state). Such a description of the anatomical body part in each one of the plurality of second anatomical spatial states is preferably determined by acquiring spatial state mapping information of a number of first mappings between the first model spatial state and a plurality of second model spatial states corresponding to the plurality of second anatomical spatial states, and then applying the first mapping to the static medical image information, in particular to the anatomical body part in an anatomical spatial state. Such a plurality of second anatomical spatial states preferably represents a model of the anatomical vital space change. For example, the plurality of second anatomical spatial states represents a whole cycle of breathing movement of the thorax, wherein each one of the second anatomical spatial states represent an individual and preferably unique phase of the cycle of breathing movement. The breathing movement of the thorax can be described in particular by the thorax volume and/or the distance of the ribs from one another, in particular the distance of neighbouring ribs from one another in a longitudinal (cranial-caudal) or a lateral direction of the patient's body.

Preferably, the transformed medical image information is binned, i.e. divided into bins or at least output in a format which allows such a binning. A bin is understood to represent a class of values, i.e. the transformed medical image information represents only histogrammes for value classes or at least contains information about the class to which a value described by the transformed medical image information is to be assigned. The binning is useful in particular in the case in which the second anatomical spatial state comprises a plurality of second anatomical spatial states. Advantageously, each bin then represents an individual (in particular discrete) phase of the anatomical vital spatial change, in particular a movement phase of the anatomical body part. In general, each bin represents a spatial segment of subsets of the plurality of second anatomical spatial states, the subsets being within each a different time segment of the time required for conducting the vital spatial change, in particular of its cycle time. If the vital spatial change is for example a breathing movement of the thorax, each bin is assigned, in particular represents, a breathing phase and/or an interval of breathing phases. In particular, each bin represents a movement phase of the thorax which corresponds to a specific breathing phase. If for example the breathing cycle is divided into five phases representing complete inspiration, half expiration, complete expiration, half inspiration and again complete inspiration. Each subset of the plurality of second anatomical spatial states therefore represents an interval of the change in spatial properties of the anatomical body part. As the change in spatial properties is time-dependent, each subset is therefore assigned to a different time segment of the time required for conducting the vital spatial change, in particular of a cycle (period) of a cyclic vital spatial change. The time segments may overlap or be disjunct.

According to a preferred embodiment, the static medical image information further describes the anatomical body part in a third anatomical spatial state which in particular differs from the first and second anatomical spatial state. The third anatomical spatial state is advantageously also static and in particular predetermined. Then, a third model spatial state contained in the plurality of model spatial states is preferably determined which corresponds to said anatomical spatial state. This determination is advantageously conducted in analogy to determining the first model spatial state which corresponds to the first anatomical spatial state, i.e. in particular by correlating or fusing static medical image information describing the third anatomical spatial state and patient model information describing the third model spatial state. The static medical image information describing the third anatomical spatial state is in particular acquired by using analytical device to conduct a medical imaging method (preferably from X-ray based medical image data such as from the computed tomography image data) during the same anatomical vital spatial change during which the anatomical body part also attains the first anatomical spatial state and preferably also the third anatomical spatial state. In order to determine the first anatomical spatial states (and preferably also the third anatomical spatial state) of the anatomical body part, at least one analytical device such as an x-ray device, CT scanner or MRT scanner is used to generate analytical images (such as x-ray images or MRT images) of the body. Analytical devices use in particular imaging methods and are in particular devices for analyzing a patient's body, for instance by using waves and/or radiation and/or energy beams, in particular electromagnetic waves and/or radiation, ultrasound waves and/or particles beams. Analytical devices are in particular devices which generate images (for example, two-dimensional or three-dimensional images) of the patient's body (in particular, internal structures and/or anatomical parts of the patient's body) by analyzing the body. Analytical devices are in particular used in medical diagnosis, in particular in radiology.

In particular, the static medical image information describing the first anatomical spatial state and the third anatomical spatial state is recorded during one cycle or plural cycles of the anatomical vital spatial change. For example, the first anatomical spatial state defines the start of a cycle and the third anatomical spatial state defines the spatial properties of the anatomical body part at a later point in time during that cycle. The third model spatial state is determined preferably by determining the similarity of an image of the third anatomical spatial state and an image of the third model spatial state which is described by the patient model information. The spatial state mapping information then preferably further describes at least one of the third mapping and the fourth mapping. The third mapping preferably maps the model part in at least one of the first model spatial state and the second model spatial state to the model part in the third model spatial state. The fourth mapping preferably maps the model body part in the third model spatial state to the anatomical body part in the third anatomical spatial state. The fourth mapping therefore advantageously also comprises a transformation between the coordinate system in which spatial properties of the third model body part are described to the coordinate system in which the spatial properties of the third anatomical body part are described. The coordinate transformation in particular is equivalent or equal to the coordinate transformation preferably comprised in the second mapping.

Preferably, the transformed medical image information is further determined based on the at least one of applying the third mapping to the anatomical body part in the first anatomical spatial state and applying the fourth mapping to the model body part in the third model spatial state. The transformed medical image information then advantageously also describes the anatomical body part in the third anatomical spatial state.

Further preferably, correction mapping data comprising correction mapping information is determined. The correction mapping information describes in particular a correction mapping from the third anatomical spatial state as it is described by the static medical image information (also termed real third anatomical spatial state) to the third anatomical state as it is described by the transformed medical image information (also termed transformed third anatomical state). The correction mapping data is preferably determined based on comparing the real third anatomical spatial state to the transformed third anatomical state. The comparison of these two individual representations of the third anatomical spatial state is preferably conducted by image fusion or correlation of the static medical image information and the transformed medical image information. The correction mapping information is then advantageously evaluated as to the properties, in particular parameters, of the correction mapping. If this evaluation indicates that the correction mapping is not equal to an identity mapping, i.e. equal to unity in the coordinate system in which the third anatomical spatial state is respectively described in the static medical image information and the transformed medical image information, the transformed medical image data is preferably determined further based on the correction mapping data. In particular, the correction mapping data is then applied to the anatomical body part in at least one of the second and transformed third anatomical spatial states described by the transformed medical image information in order to receive a corrected data set describing the anatomical body part in the at least one of the second and transformed third anatomical spatial states in the description of the transformed medical image information. Essentially, this results in using an additional CT image of the anatomical body part in the third anatomical spatial state to correct the determined, in particular calculated, representation of this anatomical body part in the second anatomical spatial state and/or the transformed third anatomical spatial state as it is described by the transformed medical image information.

Preferably, the inventive method comprises a step of determining whether at least one of the transformed third anatomical spatial state and the real anatomical spatial state is within a predetermined neighbourhood of the second anatomical spatial state. This determination is preferably conducted before applying the correction mapping to the anatomical body part in the aforementioned at least one of the second and (transformed) third anatomical spatial states which are described by the transformed medical image information. The neighbourhood can for example be defined as a spatial and/or temporal neighbourhood. This means that the correction mapping is preferably applied only if the spatial properties of the anatomical body part in the second anatomical spatial state do not differ from the spatial properties of the anatomical body part in the third anatomical spatial state by more than a predetermined difference (in particular difference in position of the anatomical body part in the two spatial states, i.e. if there is no more than a predetermined distance between the anatomical body part in the second anatomical spatial state and the anatomical body part in the third anatomical spatial state) and/or if there is no more than a predetermined time difference between the time assigned to the anatomical body part in the second anatomical spatial state and the time assigned to the anatomical body part in the third anatomical spatial state. The times assigned to the anatomical body parts in the second and thirds anatomical spatial state are in particular defined relative to the time required for conducting the anatomical vital spatial change, in particular relative to a cycle time of a vital movement such as a time required for one breathing cycle. By using such a spatial and/or temporal threshold for applying the correction mapping, too large an error resulting from correcting the spatial properties of the anatomical body part in the second anatomical spatial state on the basis of a deviation between the description of the anatomical body part in the transformed third anatomical spatial state the description of the anatomic body part in the real third anatomical spatial state can be avoided. Thus, the correction mapping is applied to the anatomical body part in the second anatomical spatial state preferably only if it is determined that the anatomical body part (in particular, its spatial properties) in at least one of the real and the transformed third anatomical spatial state is within the predetermined neighbourhood of the anatomical body part (in particular of its spatial properties) in the second anatomical spatial state.

The static medical image data is preferably acquired from (in particular as) raw image data or sliced image data which has been generated by a helical computed tomography of the anatomical body part. Raw image data is understood to describe image data which has not undergone any further processing (in particular reformatting) after being output by the medical imaging device, in particular by a CT scanner. Sliced image data is understood to describe image data which, after output from the medical imaging device (in particular CT scanner) has undergone further processing, in particular processing by an in particular three-dimensional image reconstruction algorithm to represent image information about a slice of finite (albeit infinitely small) thickness of the anatomical body part.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

The invention is also directed to a radiotherapy system comprising the aforementioned computer for executing the data processing steps of the inventive method, in particular for processing the static medical image data and the patient model data and for determining data wherever desired when executing the inventive method. The radiotherapy system preferably comprises an irradiation unit for emitting treatment radiation for radiotherapy of in particular tumour tissue. The irradiation unit is controlled by the computer of the radiotherapy system and is preferably moveable, in particular moveable relative to a treatment position of the patient's body, i.e. a position which the patient's body has during radiotherapy. To this end, preferably at least one moving unit is operatively coupled to the irradiation unit and a bed on which the patient is placed for treatment, the at least one moving unit being preferably also controlled by the computer of the radiotherapy system. The at least one moving unit in particular comprises an electric motor and the gear system for moving the irradiation unit and the patient bed. Furthermore, the computer is also configured to control activation of the irradiation unit, i.e. to control the operating parameters of the irradiation unit, in particular the energy of the treatment radiation and the point in time at which to emit treatment radiation.

The invention is therefore preferably also directed to a method, in particular a data processing method of determining a radiotherapy treatment which is preferably executed by a computer, in particular the computer of the radiotherapy system or a separate computer which is configured to execute radiotherapy treatment planning which in general is a computationally expensive task (for example a cloud computer). The data processing method of determining a radiotherapy treatment comprises the above-described data processing method of determining a change of an image of an anatomical body part. Furthermore, it also comprises a step of using the aforementioned data processing method for determining the control parameters for irradiating the patient's body. This is in particular done by determining radiotherapy plan data comprising radiotherapy plan information. The radiotherapy plan information describes in particular at least one control parameter of the radiotherapy system, in particular at least one of an irradiation dose, a time of irradiation and the irradiation direction for irradiation of the patient's body, in particular of the anatomical body part. The radiotherapy plan data is preferably determined based on the transformed medical image information, in particular based on information about the anatomical body part in at least one of the second and third anatomical movement states. The radiotherapy plan data is then preferably used to pre-configure the radiotherapy system before the radiotherapy treatment actually starts. For example, the radiotherapy plan data is read by the computer of the radiotherapy system and the computer generates instructions to be executed by the radiotherapy system based on the radiotherapy plan data. Execution of the instructions and corresponding operation of the radiotherapy system can then be activated by an operator at the desired point in time. The time of irradiation is preferably determined as a point in time at which the anatomical body part is in at least one of the second and third anatomical movement states which is supported by comparing medical image information describing the anatomical body part during the radiotherapy treatment and the plurality of second anatomical spatial states. Thereby, it can for example be determined during the radiotherapy treatment whether the anatomical body part is in a suitable position in accordance with the radiotherapy treatment plan.

The data processing method of determining a radiotherapy treatment plan is preferably executed before or during radiotherapy treatment. That means, the data processing method is preferably executed before the first application of treatment radiation or between the first and the last application of treatment radiation to the patient's body.

The disclosed method, in particular any method step associated with or directed to acquiring the medical image information or the medical image selection information, does not involve an invasive step which would represent the substantial physical interference with the human or animal body requiring professional medical expertise to be carried out and entailing a substantial health risk even when carried out with the required professional care and expertise. Furthermore, no part of the inventive method involves a step of treating a human or animal body using surgery or therapy. Rather, the invention is said to also relate to a method of planning a radiotherapy treatment or controlling a radiotherapy system rather than treating the patient's body by radiotherapy. Alternatively or additionally, the present invention can also be said to relate to a method of controlling a radiotherapy system.

In the following, the invention shall be described with reference to the figures which are to be understood as an exemplary explanation of the invention and shall not be construed to limit the invention to only those features which are shown in the figures.

Figure 1:
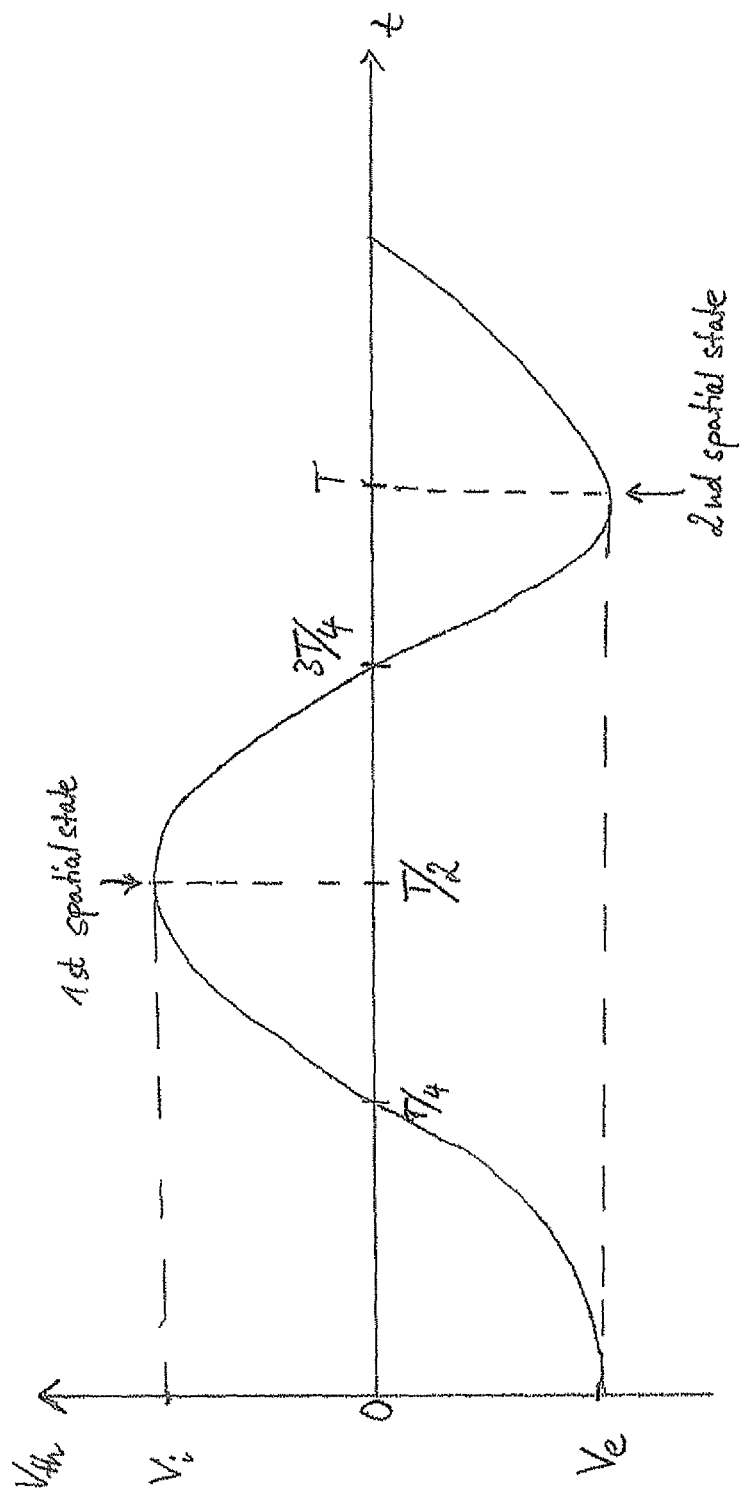
FIG. 1 shows a diagram describing a thoracic breathing movement over time.

FIG. 1 is a diagram showing the volume of the thorax $V_{th}$ against time t during a breathing cycle which is defined to start at t=0 at $V_{th}=V_e$ in a state of complete expiration. The thoracic volume $V_{th}$ then rises to a maximum of $V_i$ in the state of complete inspiration at t=T/2. The positions of the anatomical structures which characterise the thorax at t=T/2 and $V_{th}=V_i$ define the first spatial state (i.e. the first anatomical spatial state and the first model spatial state). Carrying on along the timeline of the breathing cycle, $V_{th}$ then decreases again down to $V_e$ at t=T, where T denotes the period of a cyclic breathing movement of the thorax which is defined to start and end in a state of complete expiration. The second spatial state (i.e. the second anatomical spatial state and the second model spatial state) is defined for t=T and $V_{th}=V_e$. $V_e$ and $V_i$ may for example be minimally different from another and FIG. 1 merely shows a schematic idea of the time development of $V_{th}$ with an ideal case of $V_i=V_e$.

Where in the following it is said that spatial states are mapped onto one another this is to be understood as the (anatomical or model) body part in one spatial being mapped onto the depending on context, anatomical or model body part) in another spatial state.

Figure 2:
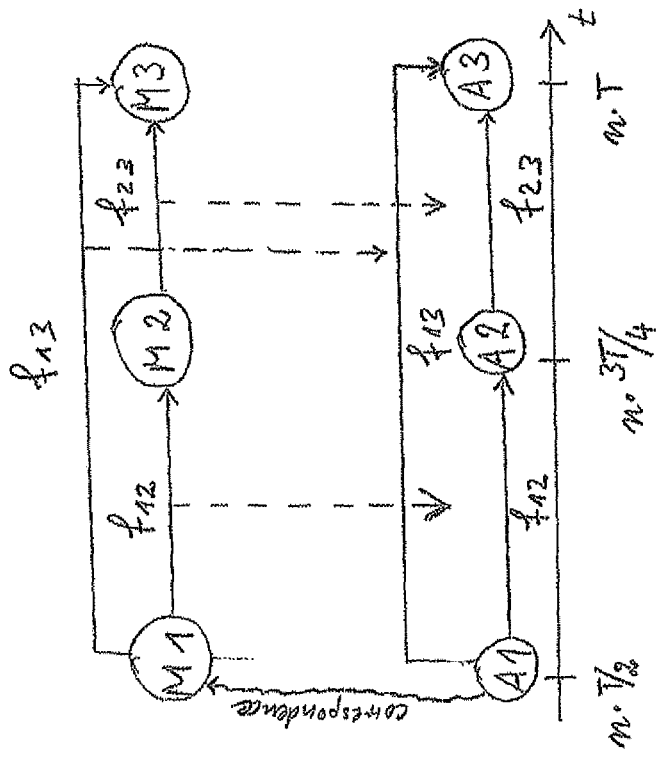
FIG. 2 shows a first embodiment of the invention for determining the third anatomical spatial state.

FIG. 2 shows a first way of determining the thoracic breathing movement of a patient starting from a single breathhold CT scan which describes the thorax in the first anatomical spatial state A1 which is defined to be at t=n·T/2, where n is an integer and T is defined as in FIG. 1. Based on the CT scan image which describes A1, a corresponding first model spatial state M1 is determined in atlas data of a patient's body.

The atlas data also has information about the spatio-temporal movement of the thorax in the generic patient model of the atlas due to breathing movement. For example, second and third model spatial states M2 and M3 of the thorax are described by the atlas data for breathing cycle time $t=n\cdot 3T/4$ and $t=n\cdot T$. Based on the atlas data, for example a first mapping $f_{12}$ from M1 to M2 is determined and, if applied to the thorax in the anatomical spatial state A1, gives a description of the specific patient's thorax in the second anatomical spatial state A2. Similarly, a first mapping $f_{13}$ for the model body part (model thorax) in the first model spatial state M1 to the model body part (model thorax) in the third model spatial state M3 can be determined from the atlas data and applied to the patient's anatomical body part (patient's thorax) in the first anatomical spatial state A1 to give a description of the patient's thorax in the third anatomical spatial state A3. When compared with the diagram of FIGS. 1, A1 and M1 describe a state of complete inspiration, A2 and M2 describe a state halfway in between complete inspiration and complete expiration, and A3 and M3 describe a state of complete expiration. Similarly, a first mapping $f_{23}$ from the second model spatial state M2 to the third model spatial state M3 can be determined from the atlas data and applied to the previously determined patient's body part in the second anatomical spatial state A2 in order to generate a description of the patient's thorax in the (transformed) third anatomical spatial state A3. The description of the patient's thorax in the (transformed) third anatomical spatial state A3 may be generated in particular by way of extrapolation of the spatial-temporal development of the spatial properties of the thorax starting from its spatial properties in the second anatomical spatial state A2. Of course, a finer discretisation can be applied to the model and/or anatomical spatial states in space and/or time as desired for the specific application, in particular as required by the envisaged radiotherapy treatment. For example, more than only one third anatomical and model spatial state may be considered, i.e. more than one anatomical and/or model spatial state may be determined in the manner in which the third anatomical and model spatial states are determined as described herein.

Figure 3:
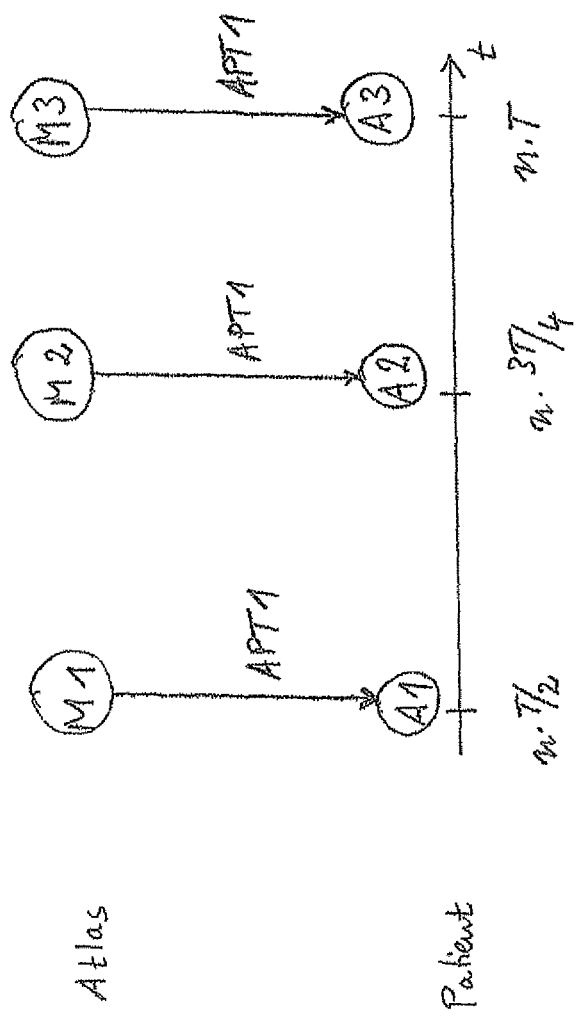
FIG. 3 shows a second embodiment of the invention for determining the third anatomical spatial state.

FIG. 3 shows an alternative embodiment of determining thoracic movement of the patient due to breathing which may, however, be used in combination with the embodiment of FIG. 2 (for example, in order to increase the reliability of the embodiment of FIG. 2). In analogy to FIG. 2, a description of a thorax in the first model spatial state M1 corresponding to the patient's thorax in the first anatomical spatial state A1 is determined from the atlas data. Based on the breathhold CT scan image from which a description of the patient's thorax in the first anatomical spatial state A1 has been determined and based on the atlas description of the model thorax in the first model spatial state M1, an atlas-patient-transformation APT1 (corresponding to the fourth mapping) is determined. The atlas preferably contains descriptions of the model thorax in the second and third model spatial states M2 and M3 along with time information for the time t of a breathing cycle with which the model thorax in model spatial states M2 and M3 is associated. If a description of the patient's thorax in the second anatomical spatial state A2 is desired, APT1 is applied to the model thorax in the second model spatial state M2, whereby the desired description of the patient's thorax in anatomical spatial state A2 is generated. Similarly, a description of the patient's thorax in the (transformed) third anatomical spatial state A3 is determined by applying APT1 to the atlas description of the model thorax in the third model spatial state M3.

Figure 4:
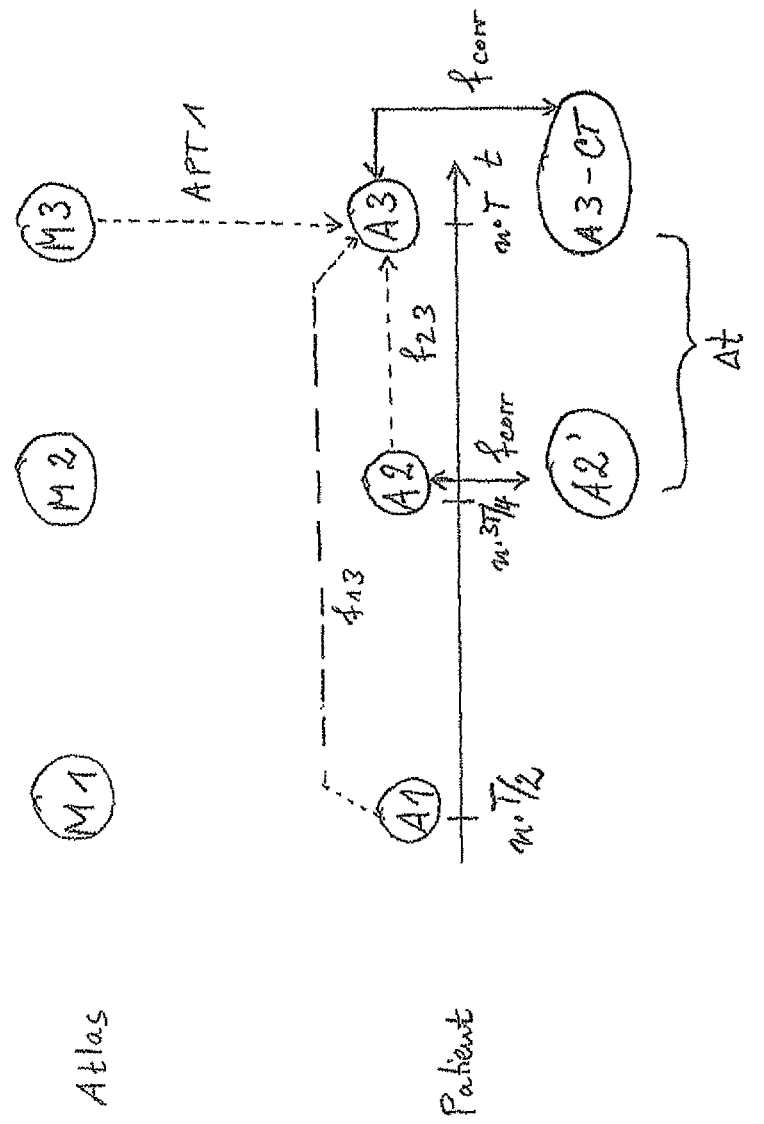
FIG. 4 shows application of the correction mapping to the second and third anatomical spatial states which have been determined according to the embodiments of FIG. 1 or FIG. 2.

FIG. 4 gives a description of how to apply a correction mapping $f_{corr}$ to the description of the patient's thorax in the second and third anatomical spatial states A2 and A3. For example, a description of the patient's thorax in the third anatomical spatial state A3 has been generated by applying a third mapping $f_{13}$ to the patient's thorax in the first anatomical spatial state A1 or by applying a third mapping $f_{23}$ to the previously determined description of the patient's thorax in the second anatomical spatial state A2. Alternatively or additionally, the description of the patient's thorax in the third anatomical spatial state A3 may have been determined by applying APT1 as a fourth mapping to the atlas-based description of the model thorax in the third model spatial state M3. In addition, a further CT scan image of the patient's thorax has been generated at $t=n\cdot T$ and describes the real spatial properties of the patient's thorax in a real third anatomical spatial state A3-CT. By comparing the description of the patient's thorax in A3 and A3-CT, the similarity of the two descriptions is determined. The similarity is characterised by the correction mapping $f_{corr}$ and usually indicates that the correction mapping is not equal to identity. If $f_{corr}$ is not equal to identity, the description of the patient's thorax in A3 is advantageously replaced by the description in A3-CT in order to have a more precise description of the anatomical spatial state of the patient's thorax at $t=n\cdot T$. Providing that a time difference $\Delta t$ between the time of the second anatomical spatial state A2 and the time of the third anatomical spatial state A3 is no greater than (in the case of FIG. 4) ½T, the same correction mapping $f_{corr}$ is applied to the description of the patient's thorax in the second anatomical spatial state A2 in order to generate a corrected description A2'.

Figure 5:
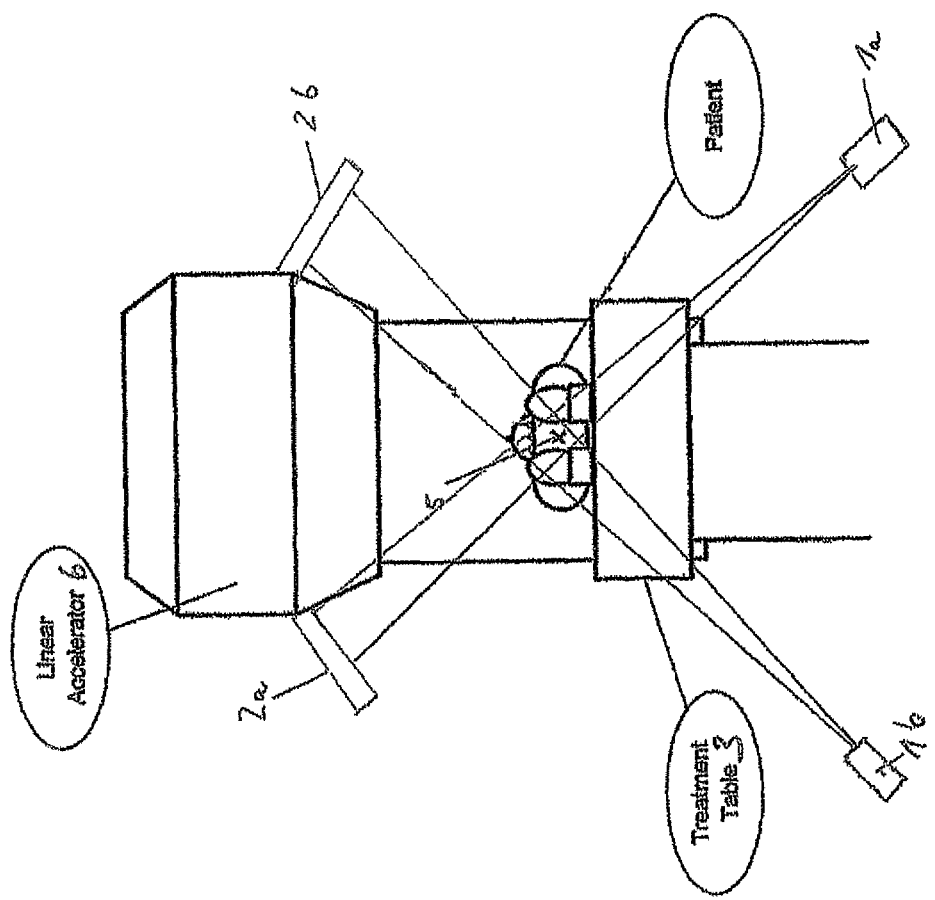
FIG. 5 shows a radiotherapy system.

FIG. 5 gives an example of a radiotherapy system comprising an irradiation unit in the form of a linear accelerator 6 which is configured to be moveable relative to the position of a patient who is lying on a (moveable) treatment table 3. X-ray tubes 1b and 1a are located for example in the floor of a room in which the irradiation unit is operated in order to for example generate X-ray images of the anatomical body part 5. The X-ray image data is acquired by sensing the X-ray signals with image detectors in the form of for example semi-conductor-based detectors 2a, 2b. The imaging geometry, in particular the position of the x-ray tubes 1a, 1b relative to the image detectors and/or their positions in a global reference system in which the radiotherapy system is operated, is predetermined (in particular known) and preferably fixed. As an alternative to the X-ray-tubes 1b, 1a, a CT scanner (in particular, a scanner configured to acquire a cone beam CT—a CBCT scanner) may be used to determine the position of the anatomical body part 5. Depending on the position determination for the anatomical body part 5 and its respective time-development corresponding to a vital movement of the anatomical body part 5, the linear accelerator 6 is moved relative to the position of the patient for application of treatment radiation to the patient's body.

The invention claimed is:
1. A radiotherapy system, comprising:
   a computer, for processing static medical image data and patient model data and for determining data;
   an irradiation unit for emitting treatment radiation;
   the computer having a digital processor and a stored computer program which, when running on the computer or when loaded onto the computer, causes the computer to perform steps for determining a change of an image of an anatomical body part of a patient's body, the steps being executed by the computer and the steps comprising:
   a) acquiring static medical image data comprising static medical image information describing the anatomical body part in a first anatomical spatial state and a third anatomical spatial state of an anatomical vital spatial change of the anatomical body part;

b) acquiring patient model data comprising patient model information describing a model body part corresponding to the anatomical body part, wherein the patient model information describes the model body part in a plurality of model spatial states of a model vital spatial change corresponding to the anatomical vital spatial change;

c) determining spatial state mapping data comprising spatial state mapping information describing at least one of a first mapping from the model body part in a first model spatial state of the plurality of model spatial states to the model body part in a second, different model spatial state of the plurality of model spatial states, the first model spatial state corresponding to the first anatomical spatial state, and a second mapping from the model body part in the first model spatial state to the anatomical body part in the first anatomical spatial state and wherein the spatial state mapping information further describes at least one of a third mapping from the model body part in at least one of the first model spatial state and the second model spatial state to the model body part in a third model spatial state which corresponds to the third anatomical spatial state and a fourth mapping from the model body part in the third model spatial state to the anatomical body part in the third anatomical spatial state;

d) determining, based on the static medical image data and the spatial state mapping data, transformed medical image data comprising transformed medical image information describing the anatomical body part in a second anatomical spatial state and the third anatomical spatial state of the anatomical vital spatial change, the second anatomical spatial state corresponding to the second model spatial state, wherein the transformed medical image information is determined based on at least one of applying the third mapping to the anatomical body part in the first anatomical spatial state and the fourth mapping to the model body part in the third model spatial state, and determining, based on comparing the third anatomical spatial state described by the static medical image information to the third anatomical spatial state described by the transformed medical image information, correction mapping data comprising correction mapping information describing a correction mapping from the third anatomical spatial state described by the static medical image information to the third anatomical spatial state described by the transformed medical image information, and when the correction mapping information indicates that the correction mapping is not equal to identity, the transformed medical image data is determined further based on the correction mapping data by applying the correction mapping to the anatomical body part in the second anatomical spatial state described by the transformed medical image information.

2. A method of determining a change of an image of an anatomical body part of a patient's body, the method being executed by a computer and comprising the following steps:

a) acquiring, at one or more processors of the computer, static medical image data comprising static medical image information describing the anatomical body part in a first anatomical spatial state and a third anatomical spatial state of an anatomical vital spatial change of the anatomical body part;

b) acquiring, at one or more of the processors of the computer, patient model data comprising patient model information describing a model body part corresponding to the anatomical body part, wherein the patient model information describes the model body part in a plurality of model spatial states of a model vital spatial change corresponding to the anatomical vital spatial change;

c) determining, by one or more of the processors at the computer, spatial state mapping data comprising spatial state mapping information describing at least one of a first mapping from the model body part in a first model spatial state of the plurality of model spatial states to the model body part in a second, different model spatial state of the plurality of model spatial states, the first model spatial state corresponding to the first anatomical spatial state, and a second mapping from the model body part in the first model spatial state to the anatomical body part in the first anatomical spatial state and wherein the spatial state mapping information further describes at least one of a third mapping from the model body part in at least one of the first model spatial state and the second model spatial state to the model body part in a third model spatial state which corresponds to the third anatomical spatial state and a fourth mapping from the model body part in the third model spatial state to the anatomical body part in the third anatomical spatial state;

d) determining, by one or more of the processors at the computer and based on the static medical image data and the spatial state mapping data, transformed medical image data comprising transformed medical image information describing the anatomical body part in a second anatomical spatial state and the third anatomical spatial state of the anatomical vital spatial change, the second anatomical spatial state corresponding to the second model spatial state, wherein the transformed medical image information is determined based on at least one of applying the third mapping to the anatomical body part in the first anatomical spatial state and the fourth mapping to the model body part in the third model spatial state, and e) determining, by one or more of the processors at the computer and based on comparing the third anatomical spatial state described by the static medical image information to the third anatomical spatial state described by the transformed medical image information, correction mapping data comprising correction mapping information describing a correction mapping from the third anatomical spatial state described by the static medical image information to the third anatomical spatial state described by the transformed medical image information, and when the correction mapping information indicates that the correction mapping is not equal to identity, the transformed medical image data is determined further based on the correction mapping data by applying the correction mapping to the anatomical body part in the second anatomical spatial state described by the transformed medical image information.

3. The method according to claim 2, wherein the anatomical vital spatial change represents a spatial change, in particular a breathing movement cycle, of the thorax due to breathing movement and wherein the first and second anatomical spatial states differ due to thoracic movement phases due to the breathing movement.

4. The method according to claim 2, wherein the second anatomical spatial state comprises a plurality of second anatomical spatial states.

5. The method according to claim 4, wherein the transformed medical image information is divided into bins, each bin representing a spatial segment of subsets of the plurality of second anatomical spatial states, the subsets being within each a different time segment of the time required for conducting the vital spatial change.

6. The method according to claim 2, comprising a step of determining, by one or more of the processors at the computer and before applying the correction mapping to the anatomical body part in at least one of the second and third anatomical spatial states described by the transformed medical image information, whether the anatomical body part in the third anatomical spatial state described by at least one of the transformed medical image data and the static medical image data is within a predetermined neighbourhood of the anatomical body part in the second anatomical spatial state, and wherein the correction mapping is applied to the anatomical body part in the second anatomical spatial state if it is determined that the anatomical body part in the third anatomical spatial state described by at least one of the transformed medical image data and the static medical image data is within the predetermined neighbourhood of the anatomical body part in the second anatomical spatial state.

7. The method according to claim 2, wherein the static medical image data is acquired from raw image data or sliced image data generated by a helical computed tomography of the anatomical body part.

8. The method according to claim 2, wherein the patient model data is acquired based on a statistical analysis of the anatomy of the anatomical body parts corresponding to the anatomical body part of a plurality of human bodies or wherein the patient model data is acquired based on medical image data of at least the anatomical body part of the specific patient.

9. The method according to claim 2 further comprising the following step:
   f) using the method for determining control parameters for irradiating the patient's body.

10. The method according to claim 8, wherein the time of irradiation is determined as a point in time at which the anatomical body part is in at least one of the second and third anatomical spatial states.

11. The method according to claim 8, wherein the data processing method is executed before or during radiotherapy treatment.

12. A non-transitory computer-readable storage medium on which a computer program is stored which, when running on a computer or when loaded onto a computer, causes the computer to perform steps for determining a change of an image of an anatomical body part of a patient's body, the steps comprising:
   a) acquiring static medical image data comprising static medical image information describing the anatomical body part in a first anatomical spatial state and a third anatomical spatial state of an anatomical vital spatial change of the anatomical body part;
   b) acquiring patient model data comprising patient model information describing a model body part corresponding to the anatomical body part, wherein the patient model information describes the model body part in a plurality of model spatial states of a model vital spatial change corresponding to the anatomical vital spatial change;
   c) determining spatial state mapping data comprising spatial state mapping information describing at least one of a first mapping from the model body part in a first model spatial state of the plurality of model spatial states to the model body part in a second, different model spatial state of the plurality of model spatial states, the first model spatial state corresponding to the first anatomical spatial state, and a second mapping from the model body part in the first model spatial state to the anatomical body part in the first anatomical spatial state and wherein the spatial state mapping information further describes at least one of a third mapping from the model body part in at least one of the first model spatial state and the second model spatial state to the model body part in a third model spatial state which corresponds to the third anatomical spatial state and a fourth mapping from the model body part in the third model spatial state to the anatomical body part in the third anatomical spatial state;
   d) determining, based on the static medical image data and the spatial state mapping data, transformed medical image data comprising transformed medical image information describing the anatomical body part in a second anatomical spatial state and the third anatomical spatial state of the anatomical vital spatial change, the second anatomical spatial state corresponding to the second model spatial state, wherein the transformed medical image information is determined based on at least one of applying the third mapping to the anatomical body part in the first anatomical spatial state and the fourth mapping to the model body part in the third model spatial state, and determining, based on comparing the third anatomical spatial state described by the static medical image information to the third anatomical spatial state described by the transformed medical image information, correction mapping data comprising correction mapping information describing a correction mapping from the third anatomical spatial state described by the static medical image information to the third anatomical spatial state described by the transformed medical image information, and when the correction mapping information indicates that the correction mapping is not equal to identity, the transformed medical image data is determined further based on the correction mapping data by applying the correction mapping to the anatomical body part in the second anatomical spatial state described by the transformed medical image information.

13. A computer having a digital processor and the non-transitory computer-readable storage medium of claim 12.

* * * * *